United States Patent [19]
Schultz et al.

[11] Patent Number: 5,619,409
[45] Date of Patent: Apr. 8, 1997

[54] PROGRAM ANALYSIS CIRCUITRY FOR MULTI-TASKING INDUSTRIAL CONTROLLER

[75] Inventors: Ronald E. Schultz, Solon; Charles M. Rischar, Chardon; Richard S. Gunsaulus, Highland Heights; Otomar Schmidt, Richmond Heights, all of Ohio

[73] Assignee: Allen-Bradley Company, Inc., Milwaukee, Wis.

[21] Appl. No.: 489,422

[22] Filed: Jun. 12, 1995

[51] Int. Cl.$^6$ .............................. G06F 19/00; G06F 9/46
[52] U.S. Cl. .................... 364/146; 364/131; 364/184; 395/183.01; 395/672; 395/733
[58] Field of Search ..................... 364/130–134, 364/140–147, 184, 185, 192, DIG. 1; 395/375, 182.13–185.1, 650, 700, 733–742, 427, 474, 775, 800

[56] References Cited

U.S. PATENT DOCUMENTS

| | | |
|---|---|---|
| 3,789,365 | 1/1974 | Jen et al. ................................. 395/737 |
| 5,295,260 | 3/1994 | Pribnow ................................ 395/183.01 |
| 5,339,425 | 8/1994 | Vanderah et al. ......................... 395/700 |
| 5,392,207 | 2/1995 | Wilson et al. ............................ 364/146 |

*Primary Examiner*—Paul P. Gordon
*Assistant Examiner*—Steven R. Garland
*Attorney, Agent, or Firm*—Keith M. Baxter; John M. Miller; John J. Horn

[57] ABSTRACT

A multi-tasking industrial controller for real-time control of machinery and the like permits the use of both periodic and event driven tasks by establishing a hierarchy of both task types in the form of priorities that resolve conflicts between events of the same and different types. Each task may access a common "global" memory area to communicate information and timing with other tasks and so as to coordinate the overall industrial control process. Trouble-shooting of the task software is made possible by a hardware address monitor which may be programmed to identify access of a particular memory location or range by any task and to record information about the particular task causing that global memory access.

9 Claims, 7 Drawing Sheets

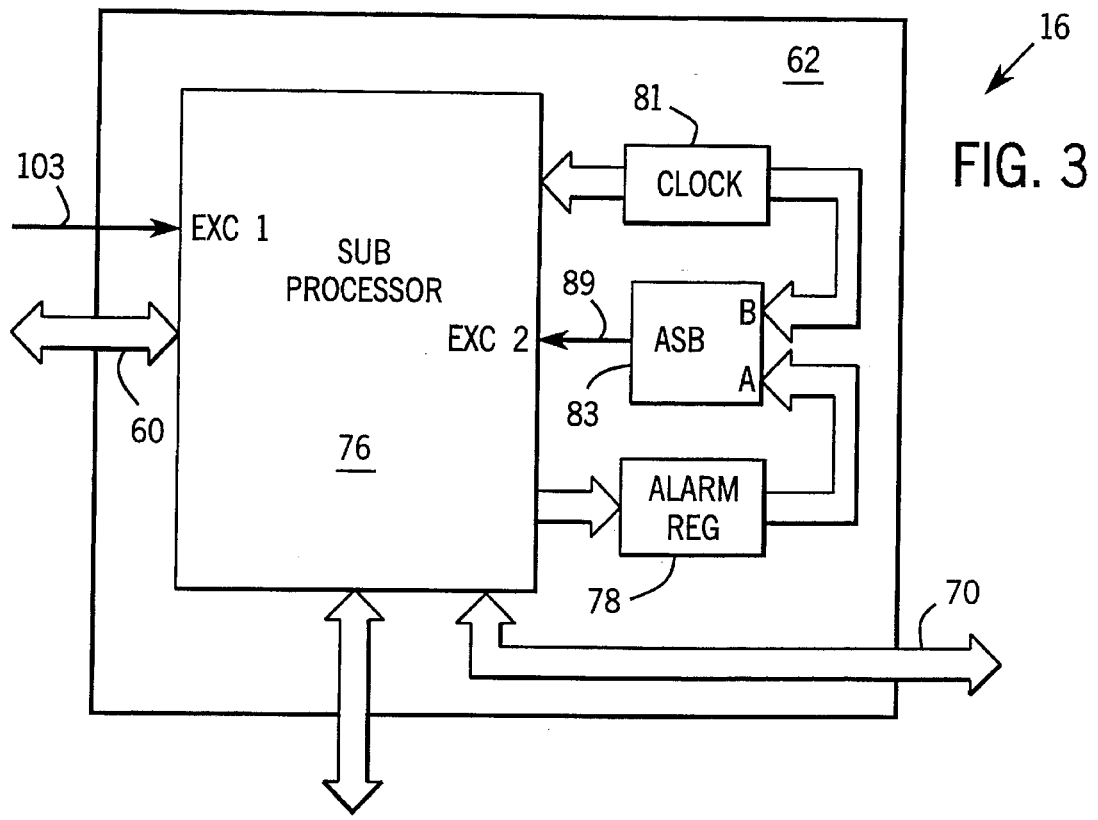

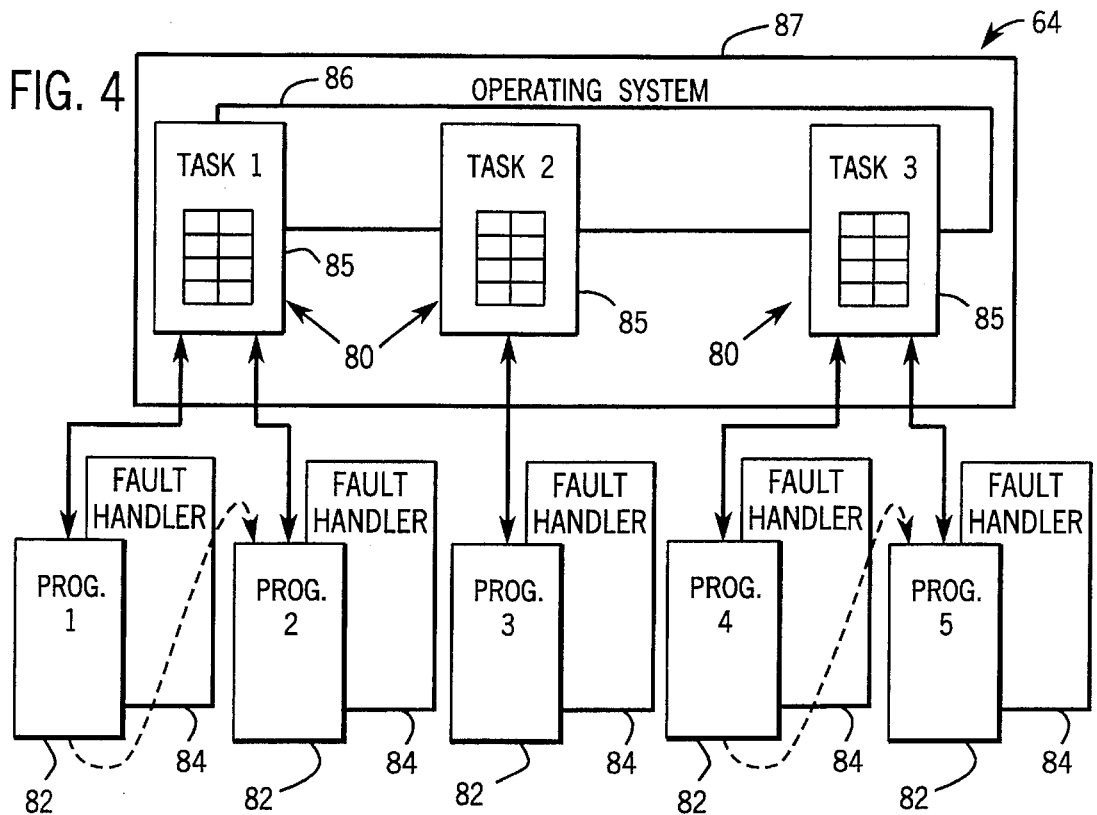

| TASK | PRIORITY |
|---|---|
| SLOW LOOP | 10 |
| FAULT | 6 |
| FILL | 8 |
| MAIN | 24 |

PROGRAM ANALYSIS CIRCUITRY FOR MULTI-TASKING INDUSTRIAL CONTROLLER

FIELD OF THE INVENTION

The present invention relates to industrial controllers for the "real-time" control of industrial processes, and in particular, to an operating system for an industrial controller that allows multiple tasks to be executed with apparent simultaneity.

BACKGROUND OF THE INVENTION

Industrial controllers are special purpose computers used for controlling industrial processes or manufacturing equipment.

Under the direction of a stored program, the industrial controller examines a series of inputs reflecting the status of a controlled process and changes outputs effecting control of the process. The inputs and outputs are most simply binary, that is "on" or "off"; however, analog inputs and outputs, taking on a continuous range of values, are also used.

Industrial controllers are frequently programmed in a "relay ladder" language where instructions are represented graphically by "contacts" and "coils" of virtual relays connected and arranged in ladder-like rungs. This relay ladder language, with its input contacts and output coils, reflects the emphasis in industrial control on the processing of large amounts of input and output data. The relay ladder language also reflects the fact that most industrial control is "real-time"; that is, an ideal industrial controller behaves as if it were actually composed of multiple relays connected in parallel rungs to provide outputs in essentially instantaneous response to changing inputs.

Other industrial control languages are also used including: function block languages which represent instructions as functional blocks having inputs and outputs connected to the inputs of other functional blocks; sequential function chart languages which represent the control process as a series of discrete states responsive to historical input and output data, and structured text languages which most closely resemble conventional computer programs such as FORTRAN and C.

Unlike programs written for industrial control, conventional computer programs frequently contain instructions causing loops in their execution pending an external event, for example, where the processor repeats a test instruction until an input condition is satisfied. Such loops can cause the execution time of the program to vary substantially, depending on how soon the external condition is satisfied.

In contrast, programs written for real-time control normally are fashioned to have a well defined execution time as they cycle through the program from beginning to end. This is a result, in part, of the need for these programs to process many inputs and outputs concurrently. If the processor "waits" for one input, e.g. by looping, this waiting adversely affects the speed of the processing of the other inputs.

For a control program written in ladder form, for example, the program continuously scans the "rungs" of the ladder reading inputs and writing outputs determined from those inputs and the logic of the ladder. The scanning time is relatively constant.

It would be desirable to write large programs for industrial controllers as separate "tasks" that could be independently run and checked. For example, different machines along a single assembly line might be controlled with separate programs, each written as a separate task. The tasks for different machines, although developed separately, could then run on a single processor in a manner so as to appear to be executing simultaneously. Apparent simultaneous execution would be obtained by rapidly switching a single processor between tasks. Controllers or computers having operating systems that permit the simultaneous execution of multiple tasks are termed "multi-tasking".

The tasks that are normally executed in a conventional computer environment are largely independent of one another. In contrast, the task executed in an industrial control environment are normally highly interrelated as a result of the physical linkage between the parts of the process they control. For example, in an industrial control situation, if one task is controlling the positioning of containers on a conveyor belt and another task is controlling the dispensing of ingredients into those containers, these tasks must communicate between each other to coordinate their actions logically and in time.

One method of coordinating multiple tasks is through the use of "global" memory which may be accessed by all tasks. Common variables and flags stored in global memory may be used to permit the tasks to communicate data and timing information. More generally, the tasks may use global memory to share instructions for common routines employed by more than one task.

The use of global memory that may be read and written to by a number of tasks can make it difficult to identify minor code errors or "bugs" relating to the execution of a given task. For controllers executing only a single task and executing instructions from re-writable memory, instructions ("breakpoints") may be inserted into the task being executed to stop the task at certain points in the task program so as to output values of certain memory locations to the operator. These breakpoint instructions allow the operator to observe the progress of the task program as it is reflected in the changes in memory values caused by the task program, and thus to evaluate the operation of the task on a step-by-step basis. Breakpoint instructions inserted into the program being executed are not possible when that program is firmware as may be contained in read-only-memory.

In a multi-tasking industrial control system, the multiple tasks may interrupt each other on an unpredictable basis and the multiple tasks are executed without predetermined order. Accordingly, the view of the operation of a first task provided by a breakpoint instruction in that task, may be immediately corrupted by a second task interrupting the first task. Generally, the fact that a given global memory address has a particular value at one point in a given task does not ensure that value of that memory location is the same when the next step of the task is executed. As a result, evaluating multi-tasking realtime operating systems, employing significant amounts of global memory, is difficult.

SUMMARY OF THE INVENTION

The present invention provides a circuit that monitors the address lines used by the processor of a multi-tasking industrial control system to read or write values to global memory. The circuitry includes programmable registers which define one or more memory locations and a comparator which interrupts the operation of the processor when those memory locations are accessed in a predefined manner.

A software interrupt routine allows both identification of the fact that the memory locations were accessed and the particular task making the access.

In particular, the present invention provides an industrial controller operating controlled equipment according to a control program divided into at least two tasks. The controller includes: an I/O module receiving electrical inputs and outputs connected to controlled equipment, a user terminal for entering data from the user providing a breakpoint value, and an electronic memory. A bus communicates data to and from memory locations of the electronic memory, the data of the memory including instructions for the tasks, variables for the tasks, an operating system controlling execution of the tasks, and instructions for a breakpoint recording program. Circuitry monitoring the memory locations of the transfer of data to and from the electronic memory produces a breakpoint signal when the memory locations match one or more particular memory locations indicated by the breakpoint value. An electronic processor communicating with the I/O modules and executing the operating system executes at least one of the two tasks according to the task scheduling table except upon occurrence of the breakpoint signal when it executes the breakpoint record routine to record an indication of a specific one of the two tasks being executed.

Thus, it is one object of the invention to provide a "trouble-shooting" system for a multi-tasking industrial controller that may identify changes in global memory to the task making the change. The circuitry of the present invention unlike a software system adds no overhead to the execution time of the tasks, an important feature for realtime control. Nevertheless, the circuitry permits the triggering of a breakpoint record routine which reveals the particular task being executed. Conflicts between tasks caused by unexpected changes in global memory can thus be resolved.

The circuitry for monitoring the memory locations may also detect whether a read or write of the memory is occurring and whether the processor expects a memory location being read to contain an instruction as indicated by control lines from the processor. A range of memory locations may be identified so that any alteration of a memory location either within or outside of the range can cause the breakpoint record routine to be activated.

Thus, it is another object of the invention to provide a flexible tool for checking the operation of a multi-tasking system.

The foregoing and other objects and advantages of the invention will appear from the following description. In the description, reference is made to the accompanying drawings which form a part hereof and in which there is shown by way of illustration, a preferred embodiment of the invention. Such embodiment does not necessarily represent the full scope of the invention, however, and reference must be made therefore to the claims herein for interpreting the scope of the invention.

BRIEF DESCRIPTION OF THE DRAWINGS

FIG. 3 is a more detailed block diagram of the processor of the controller of FIG. 2 showing the implementation of an alarm timer used for the multi-tasking scheduling;

FIG. 4 is a schematic representation of the multiple tasks and their associated programs in the memory of the controller of FIG. 1, each program having an associated fault handler;

FIG. 5 is a task scheduling table providing information entered by the user used for scheduling the tasks to make best use of the processor resources;

FIG. 6 is a schedule list produced by the present operating system and used to program the alarm of FIG. 3 for the multi-tasking of the controller of FIG. 1;

DETAILED DESCRIPTION OF THE PREFERRED EMBODIMENT

Figure 1:
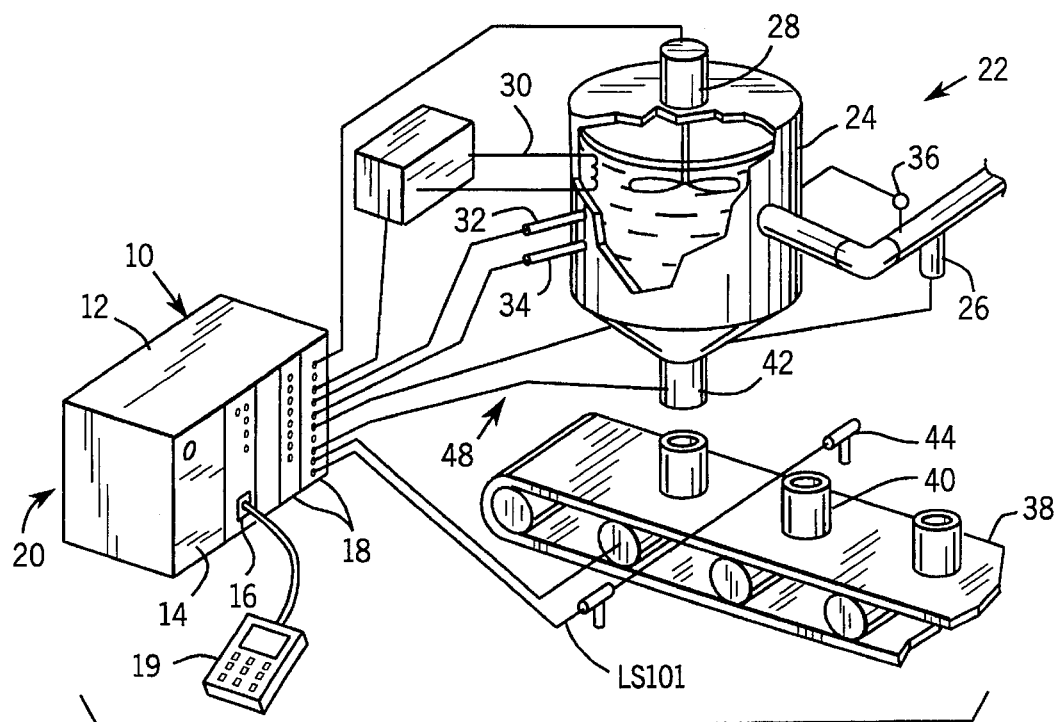
FIG. 1 is a perspective view of a simplified industrial control application including control of a conveyor line and a mixing tank as may be controlled by one industrial controller employing the multi-tasking operating system of the present invention.

Referring now to FIG. 1, the multi-tasking operating system of the present invention permits an automation controller 10 to execute with apparent simultaneity a number of different tasks associated with the controlled equipment 22.

An Example Industrial Process

In the process shown, the automation controller 10 is connected to a mixing tank 24 where it controls the flow of materials into the tank via a valve 26 and the temperature and agitation of those materials via an agitator 28 and a heater 30 under feedback control via signals obtained from a thermocouple 32, a pressure transducer 34 and a flow sensor 36. Thus, the temperature of the material contained in the tank 24 may be regulated in a feedback loop by means of the thermocouple 32 and the heater 30. Likewise the flow may be regulated in a feedback loop with valve 26 and flow sensor 36. An additional feedback loop may regulate the pressure within the tank 24 as a more complex function of temperature and flow rate.

Figure 2:
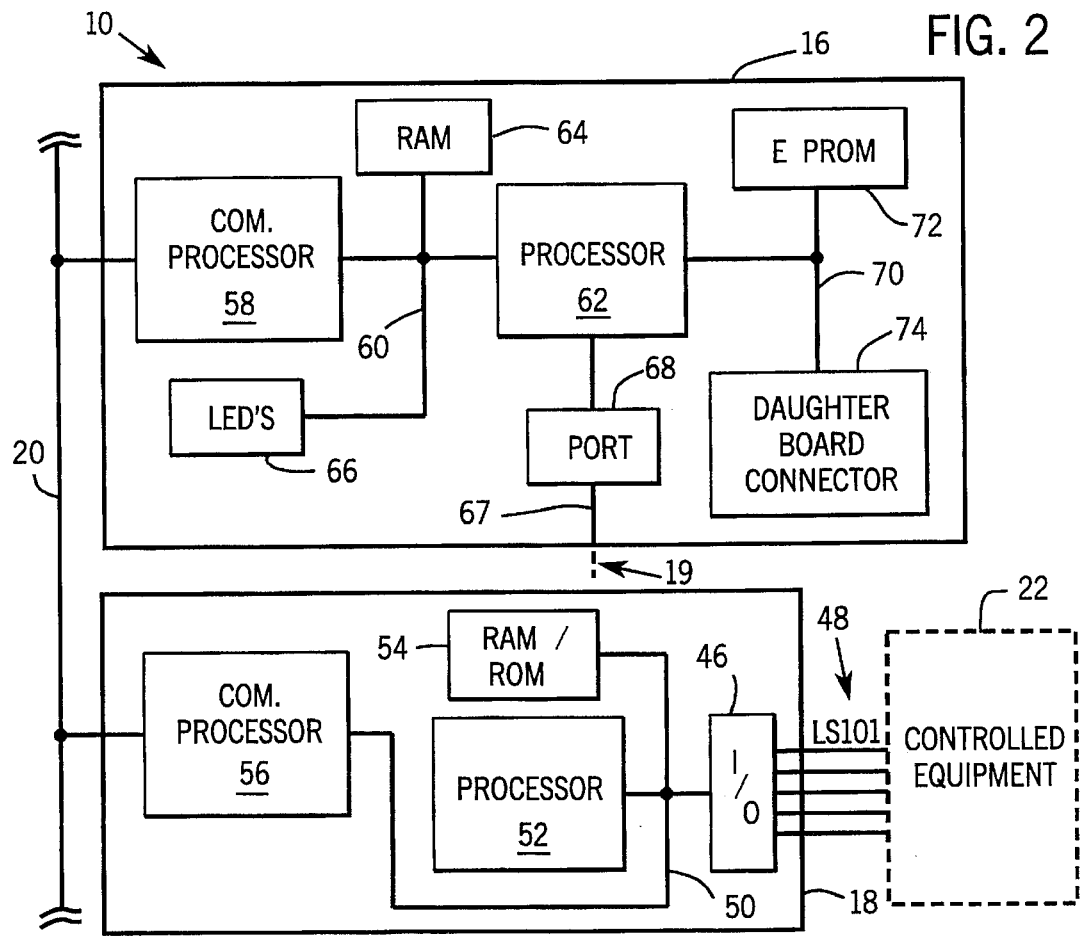
FIG. 2 is a block diagram of the controller of FIG. 1 showing the processor module, and I/O module, and the latter's connection to the controlled equipment of FIG. 1.

The automation controller 10 also controls, in the example, a conveyor belt 38 having cans 40 to be filled from the tank 24. The controller controls a spigot 42 from the tank 24 and the positioning of the conveyor belt 38 and receives signals from a limit switch 44 shown as a photoelectric beam so as to correctly position the containers under the spigot 42 for filling. Referring to FIG. 2, the signal lines 48 from the limit switch 44 (shown in FIG. 1) is designated LS101, and will be used to initiate a task as will be described below.

Controller Architecture

Referring now to FIGS. 1 and 2, an automation controller 10 includes generally a rack 12 holding one or more controller modules including a power supply 14, a processor module 16, and one or more input/output "I/O" modules 18 connected together via a backplane 20 passing along the rear of the rack 12. I/O modules such as 18 are generally known in the art and operate to receive signals and transmit them to the processor module 16 under the operation of their processor 52. The processor module 16 receives inputs from controlled equipment 22 via the input/output modules 18 and provides outputs to the controlled equipment 22 by those same input/output modules 18.

The signal lines 48 from the controlled equipment 22 are received by the I/O module 18 at interface circuitry 46. The interface circuitry 46 contains protection circuitry, such as optical isolators, and conversion circuitry, such as analog to digital or digital to analog circuitry, for converting the I/O signals 48 to digital representations that may be transmitted on an internal bus 50 of the I/O module 18.

The internal bus communicates with an I/O module processor 52, a memory unit 54 composed generally of random access and read-only memory (RAM/ROM) and a communication processor 56 connecting the I/O module 18 to a high speed backplane 20 for communication with other modules, and in particular, the processor module 16. Processor 52 thus may receive instructions and programming from the processor module 16 as will be described below. The I/O module 18 may be constructed according to methods well understood in the art.

A communication processor 58 in the processor module 16 handles the communication protocols of the high speed backplane 20 and relays information between that high speed backplane 20 and an internal bus 60 of the processor module 16. The internal bus 60 is also connected to the processor 62 of the processor module as well as random access memory ("RAM") 64 and a front panel LED display 66. The processor 62 provides a separate serial port 68 used for diagnostics and programming and another internal bus 70 communicating with erasable programmable read-only memory (EPROM) 72 and a daughter board connector 74 which may be used for memory expansion on a separate card.

Generally during operation, the processor 62 reads program instructions from the EPROM 72 and transfers data to and from RAM 64, that data representing desired inputs and outputs interchanged by the communication processor 58 with the I/O module 18 and thus with the controlled equipment 22. The general architecture and operation of the automation controller 10 thus far described will be familiar to those of ordinary skill in the art.

Referring now to FIG. 3, the processor 62 of the processor modules 16 incorporates specialized circuitry for providing an alarm signal to the processor 62 on a periodic basis without the need for software timing loops by the processor 62. Specifically, a subprocessor 76 of the processor 62 receiving a 32-bit time value from a clock 81 adds a predetermined timer interval to the value of the clock 81 and stores the sum in alarm register 78. When the value of clock 81 equals the value in the alarm register 78, a comparator 83 provides an exception signal 89 to the subprocessor 76 which serves to interrupt the subprocessor's execution of its program in EPROM 72 and causes the subprocessor to jump to a new program for execution, as will be described.

The subprocessor 76 is a custom integrated circuit adapted for rapid execution of industrial controller languages. However, it will be understood that the following invention will be equally applicable to general purpose microprocessors and is not dependent on particular details of the processor beyond those described here.

Tasks Run on the Controller

Referring now to FIG. 4, it is desirable, both for programming ease and processor efficiency, to divide a control program used to control the equipment 22 of FIG. 1 into a number of tasks 80. Each task 80, stored in memory 64, and having access to a global area of memory 64 is a part of the entire control program for controlling equipment 22, divided according to a logical separation in control tasks determined by the programer. For example, in the application of FIG. 1, the feedback loops controlling the mixing in tank 24 may be separate tasks from those controlling the conveyor belt 38. The feedback loops are distinct from, the control of the conveyor belt to the extent that each is synchronized only loosely with the other and control physically separate equipment. Thus each can be developed separately. A further distinction between the process control of the feedback loops and the conveyor control is that the former is essentially free-running and requires little synchronization to outside events whereas the latter is episodic but needs a high degree of synchronization to outside events. The separation of a program into tasks reflecting these fundamental differences in character of the programming goal may be accommodated in the tasks scheduling system as will be described below.

Each task 80 includes a task control block 85 executed by the operating system 87 and one or more programs 82 within the RAM 64 or EPROM 72. The programs 82, as contained in RAM 64 or EPROM 72, need not be contiguous with particular tasks which refer to them. Generally, the task control block 85 includes: a name for identifying the task, pointers to one or more programs 82 associated with that task, and scheduling data as will be described below with respect to FIG. 5. The task control block 85 also identifies storage areas in RAM 64 used for storing values essential to resuming execution of the task 80, if the task 80 is interrupted, such as the contents of registers associated with subprocessor 76 and the location of the stack used by the subprocessor 76 in executing that task. This information from the registers and stack associated with the task are stored so when the task is resumed, there will be no loss of data necessary for the completion of the program.

As will be described in more detail below, the tasks 80 are run by the operating system 87 according to a schedule defined by the programmer from data entered into a task scheduling table 88. When a task 80 is invoked, a program associated with the task control block 85 begins execution of the programs 82 associated with the task 80 in sequence from a starting point to an ending point in each program. After the completion of each program 82, the program 82 returns control to the program of the task control block 85 so that completion of the program 82 within a certain period of time may be verified through a watchdog system as will also be described. The program of the task control block 85 then switches to the next program 82 of the task 80 so that the programs 82 seem to execute one after another.

Fault Handling for the Tasks

Each program 82 is also associated with a local fault handler 84 which is executed when the processor 62 encounters a predefined error during the execution of that program 82. Such error conditions include arithmetic overflows and other errors well known in the computer field as well as watchdog timeouts to be described. A system fault handler 86 is also associated with all tasks 80.

If a fault occurs during a program 82, the local fault handler 84 which is associated with the program 82 is executed to process the fault. If the local fault handler 84 does not address the fault, (indicated by a failure to clear the fault condition register), the system fault handler 86 is invoked and if the fault is then not addressed, the automation controller 10 shuts down and ceases execution of the tasks and their associated programs. Thus, fault handling is closely tied to the context of the fault as deduced from the program. This approach permits faults to be treated differently during execution of different programs depending on how critical they are to the correct operation of that program. This approach further recognizes that for some industrial control processes it may be better to operate the system with the possibility of error caused by the faults than to shut the system down with the certainty of attendant high costs.

Task Scheduling and Execution

Referring now to FIGS. 1 and 5, data defining each task 80 may be entered by the programmer through the programming terminal 19, or other terminal based on the programmer's knowledge of the overall operation of the controlled equipment 22 and the particular tasks and their criticality. This data is received by a task scheduling table 88 and used by the task control blocks 85.

As represented schematically, the task scheduling table 88 includes columns indicating a task name, a task priority, a task scheduling type, the task trigger condition, the programs 82 associated with the task, and a watchdog time value. The significance of the data entered into each of these columns may be explained by reference to example tasks forming the rows of the task scheduling table 88 and used to control the equipment 22 of FIG. 1.

A first task 90 incorporates two programs named "TEMP PID" and "FLOW PID" which control the temperature and flow of material in the tank 24. These programs implement feedback loops using a proportional-integral-derivative "PID" control algorithms. Although these algorithms may be quite complex, temperature and flow are generally slowly varying quantities and thus the programs need not be invoked at a high rate. Thus, these programs contained in task 90 are entitled: "slow loops" in the first column of the task scheduling table 88.

Normally process control is extremely sensitive to control failures insofar as an entire batch of materials and the equipment processing it can be ruined. For example, failure to properly agitate and maintain temperature of a resin could conceivably cause the resin to solidify in the mixing container destroying both the resin commercial value and the container in which it is being mixed. For this reason, it may be desirable to make such process control tasks a high priority. Nevertheless, priority is relative to other tasks and in this example, the slow loops of task 90 are given a priority of ! 0 in the task scheduling table 88—a lower priority than any of the other programmer written tasks 80.

The scheduling of these programs of task 90 is periodic, that is, the user has entered data indicating that the task is periodic, i.e, that it should be performed periodically at a regular interval, in this case every 100 milliseconds as indicated in the condition column. This results from the fact that the control algorithms of task 90 require regular correction but need not be synchronized to an external event.

Each program of task 90 is also given a watchdog time value, in this case a 5 ms in the final column in the task scheduling table 88 of FIG. 5 indicating a period of time during which it is expected that the programs of TEMP PID and FLOW PID may be executed once from start to finish. This watchdog value is critical in the present multi-tasking insofar as it provides assurance that the highly variable event triggered tasks do not overtax the system resources.

As will be described, a timer holding the watchdog time runs after the program has begun regardless of whether the program has been interrupted by programs of other tasks and thus provides an ongoing indication of the amount of time taken to execute each program.

A second task 92 of the task scheduling table 88, entitled FAST LOOPS, incorporates a PRESSURE PID program which controls the pressure of the material within the tank 24. Here unlike the process programs of task 90, the controlled variable of pressure may change relatively quickly and thus the task is scheduled periodically on a 10 millisecond rate. It is nevertheless given a higher priority of 9 compared to the slow loops based on the relative importance of timely execution of these two tasks. Like the SLOW LOOPS task 90, the FAST LOOPS task 92 is periodic and has a watchdog time value of 5 ms.

A third task 94 entitled: FILL, in the task scheduling table 88 includes programs CAN STOP and CAN FILL that stop a can 40 underneath the spigot 42 and initiate a filling of the container from the tank 24. These tasks are required only when a can 40 has arrived at the tank 24 and thus there is no need to run this task 94 continuously as is done with SLOW LOOPS and FAST LOOPS tasks described above. Here therefore, the programmer has designated the FILL task 94 as an event triggered rather than periodically triggered task. Event triggered tasks are those which are only invoked upon the occurrence of an external event, such as a change in an input signal from the controlled equipment 22 rather than simply the passage of time. In this case, the condition for the triggering is a closure of the limit switch 101 I/O line indicating a true state as indicated in the task scheduling table 88. This event is identified by an event ID sent by an I/O module as will be described. More than one event ID can be entered here, causing the task to be triggered by either of the events, and two or more tasks can have the same triggering event ID.

For this task 94, in contrast to the process loops tasks described above, although the can filling process is relatively slow, the program that must be run upon a can being detected is fast, requiring no complex computations and therefore the watchdog value can be 1 millisecond. Note that the programs CAN STOP and CAN FILL are written so as not to loop and wait while the can is filling. The fill task 94 is given a priority of 8.

A fourth task 98 designated MAIN includes a program AGITATOR CHECK and MAINTENANCE LOG, which in the example of FIG. 1, check the operation of the agitator 28 to see that it is working and log the hours of equipment usage in a table for maintenance purposes. These tasks essentially need to run continuously but have no strong demands of a particular period of execution or a triggering event. Also they are of low priority. Accordingly, they have been designated continuous as opposed to periodic or event triggered and are executed during a portion of any time remaining after any pending periodic or event tasks are executed. Although an extremely demanding use of the processor for the slow and fast loops of tasks 90 and 92 could conceivably prevent the continuous tasks from ever being executed, typically, the continuous task 96 will receive a substantial portion of the processor time in an acceptably loaded processor.

For the continuous tasks 96, the condition column contains a continuous allocation limit which allocates some percentage of the time that would normally be devoted to continuous tasks to other lower priority tasks 98 such as communications or other system tasks not entered by the programmer but used by the operating system 87.

The operating system 87 establishes its own tasks 100 at higher priorities than the user tasks 90 through 96. Also at a higher priority is the system fault handler task 102. These tasks are shown to establish the range of priorities actually observed by the operating system 87 but do not require any programmer input.

Referring now to FIG. 6, the operating system 87 reviewing the user data from task scheduling table 88 prepares in essence an occurrence queue 104 having one column listing "occurrences" defined as tasks or watchdog timers that are running, the latter which will be described below. Each occurrence is linked to an initiation time value associated with the 32 bit clock word from clock 81 of FIG. 3.

Each periodic task, when placed in the occurrence queue 104 will be associated with an initiation value equal to the current time of the clock 81 plus the period of the task obtained from the task scheduling table 88. More generally, the initiation value associated with a periodic task will be the clock value from clock 81 at the task's last time of execution plus the period of the task obtained from the task scheduling table 88.

Figure 7A:
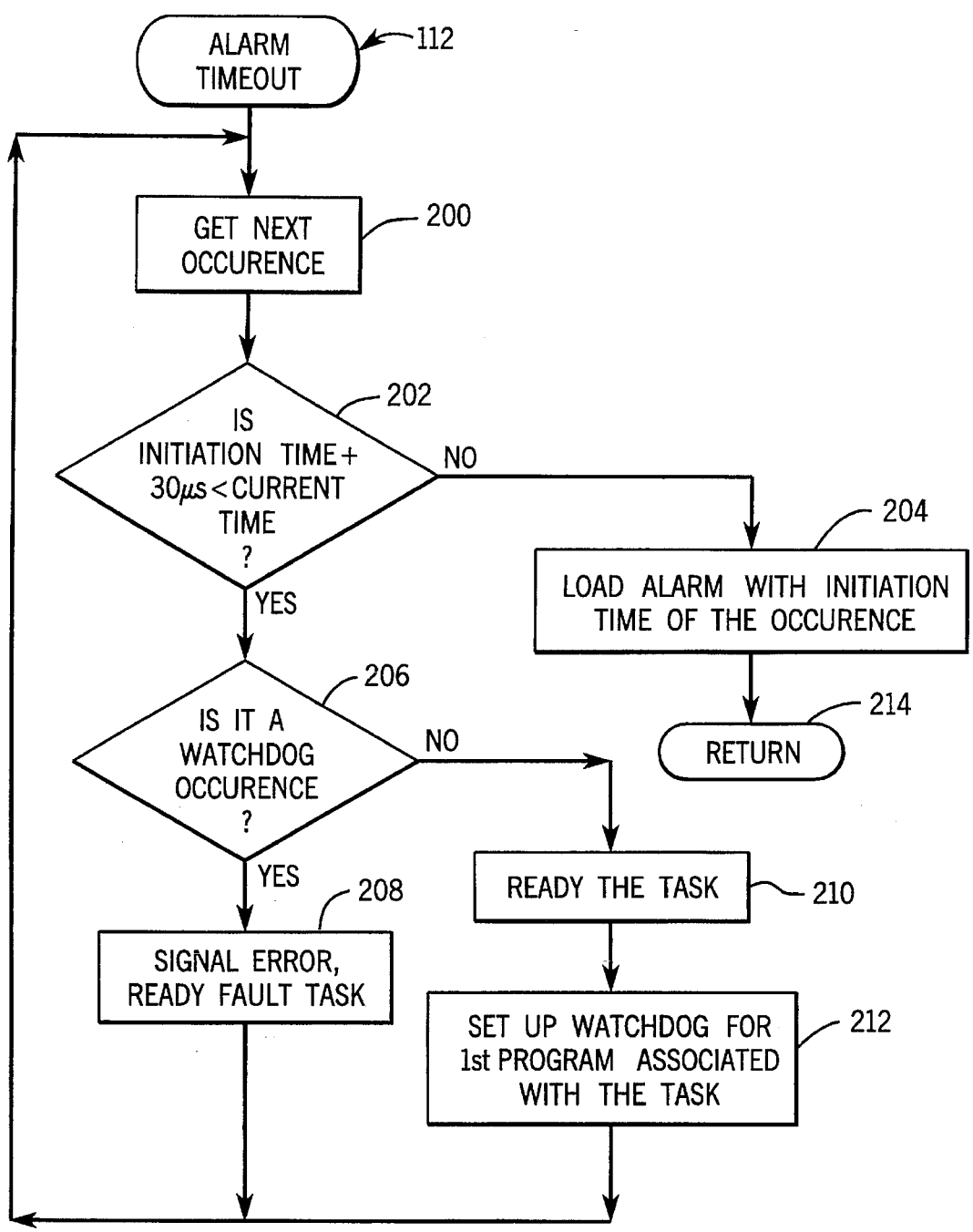
FIGS. 7(a), 7(b) and 7(c) are simplified flow charts of the operating system as it executes on the controller of FIG. 1 to execute periodic and event triggered tasks.
Figures 7B, 8:
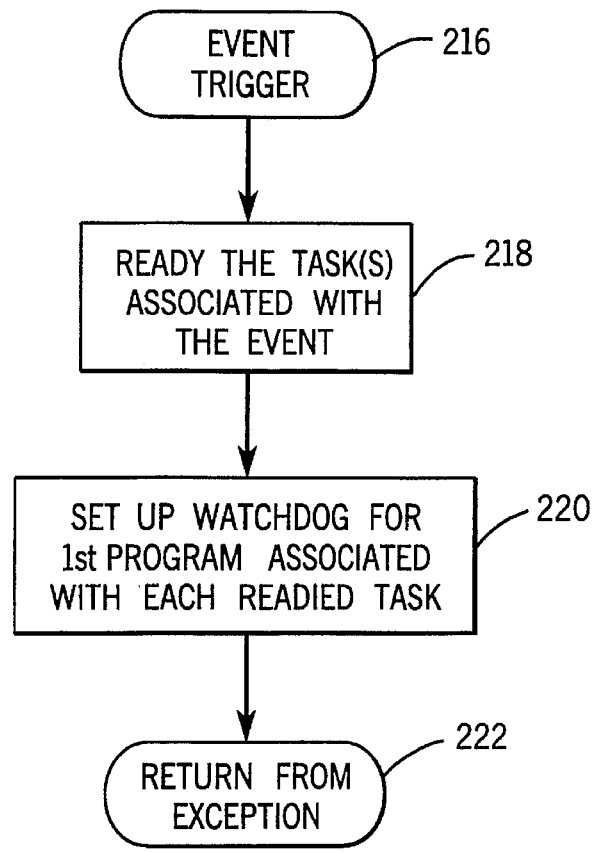
FIG. 8 is table representation of a ready list providing a queue of pending tasks.

When an initiation time for a periodic task is reached, the task is transferred to a ready list 120 shown in FIG. 8 and providing a list of all tasks ready for current execution and their priority. For event driven tasks, the task is not placed in the occurrence queue 104 but moves directly to the ready list 120 when the triggering event occurs.

In either case, upon enrollment of a task in the ready list 120, a watchdog timer occurrence for the first program of that task is entered in the occurrence queue 104. This watchdog initiation time is equal to the initiation time of the task plus the watchdog time value of the first program, as listed in the task scheduling table 88. As each program completes execution, the watchdog timer of the next program associated with the task is entered into the occurrence queue 104.

Under the control of the operating system 87, the subprocessor 76 reviews the occurrence queue 104 to identify all occurrences having initiation times equal to or less than the clock value provided by clock 81 together with those occurrences having starting times within 30 microseconds of the clock value provided by clock 81. These latter occurrences are so close to the earlier occurrences for it to be impractical to treat them as different occurrences under the system.

Thus for example, task 90, the SLOW LOOPS and task 92, the FAST LOOPS shown in the task scheduling table 88 with initiation times of 10274.000 ms and 10274.025 ms would be selected to be readied together. The initiation time of the next occurrence in the occurrence queue 104 is then loaded by the subprocessor into the alarm register 78 of FIG. 3 and the operating system 87 attends to other demands while it awaits an exception signal 89 from the comparator 83.

Referring now to FIGS. 5, 6 and 7(a), for a periodic task, the process of moving tasks from the occurrence queue 104 to the ready list 120 begins at process block 112 where an alarm timeout is received from comparator 83 shown in FIG. 3. As indicated in process block 200, at this time the occurrence queue 104 is reviewed to get the next occurrence, in the order of the occurrence's initiation times.

As indicated by decision block 202, if the next occurrence is ready for execution as indicated by its initiation time, the program proceeds to decision block 206.

At decision block 206, if the occurrence is a watchdog occurrence, indicating that a program associated with a ready task has failed to execute within the required time, the program proceeds to process block 208 and fault flags are set. The appropriate fault task is loaded into the ready list 120.

Otherwise, at decision block 206, if the occurrence is not a watchdog occurrence but a task, the task is readied, as indicated by process block 210, which places the task in the ready list 120, and the program proceeds to process block 212.

At process block 212, a watchdog occurrence for the first program 82 associated with the readied task is entered into the occurrence queue 104.

The operating system then proceeds back to process block 200 and the next occurrence is identified. If at subsequent decision block 202, the next occurrence is not ready for an execution, the program proceeds to process block 204 and the alarm register 78 (FIG. 3) is loaded with the initiation time of that identified next occurrence. The alarm servicing routine of the operating system then exits at block 214.

Tasks, that are of an event type such as task 94, are not triggered by the coincidence of an initiation time and the value of the clock 81 but rather by the receipt of an event signal indicating a change in the input or output identified in the condition column of the task scheduling table 88.

Referring to FIGS. 2 and 3, the detection of a change in an input or output identified in the task scheduling table 88 would normally consume considerable processor time because the processor would be required to almost continuously scan a list of inputs or outputs identified to events to generate the necessary event signal if one of those inputs or outputs changed.

In contrast in the present invention, the responsibility for identifying the events is transferred to the I/O modules 18. In particular, upon initiation of the operating system 87, the processor 62 reads the task scheduling table 88 for event triggered tasks and transmits a message through the backplane 20 to the I/O module 18 causing the I/O module to undertake a review of that event on a periodic basis as required. In this manner, the burden of detecting events is shifted from the subprocessor 76 to the I/O modules. Large control systems with multiple I/O modules 18 will have correspondingly greater resources for detecting multiple events.

Upon detecting an event, the I/O modules 18 send a message having a special character string to the communication processor 58 the character string indicating that the messages signal an event. The message also contains information that allows the controller to identify the event. The task scheduling table 88 identifies the tasks associated with the event. The communication processor 58 provides an exception input 103 to the subprocessor 76 in the same manner as that of the alarm register 78, clock 81 and comparator 83. Only upon occurrence of this exception input is the operating system 87 interrupted to read the message and recognize the particular task that has received a trigger.

Upon receipt of such a trigger, the task associated with the triggering event is placed in the ready list 120 and the watchdog occurrence of its programs are placed in the occurrence queue 104 and receive an initiation time equal to the value of the clock 81 and the watchdog time value.

Specifically, an event trigger, as indicated by process block 216, causes the operating system to immediately ready the task associated with that event by placing it in the ready list 120 as indicated by process block 218 and in a manner similar to previously described process block 210.

A watchdog occurrence for the first program 82 associated with the readied event triggered task is then entered into the occurrence queue 104 as indicated by process block 220 and the program returns at process block 222.

A continuous task, such as task 96 is permanently enrolled on the ready list 120 together with its priority.

Figure 7C:
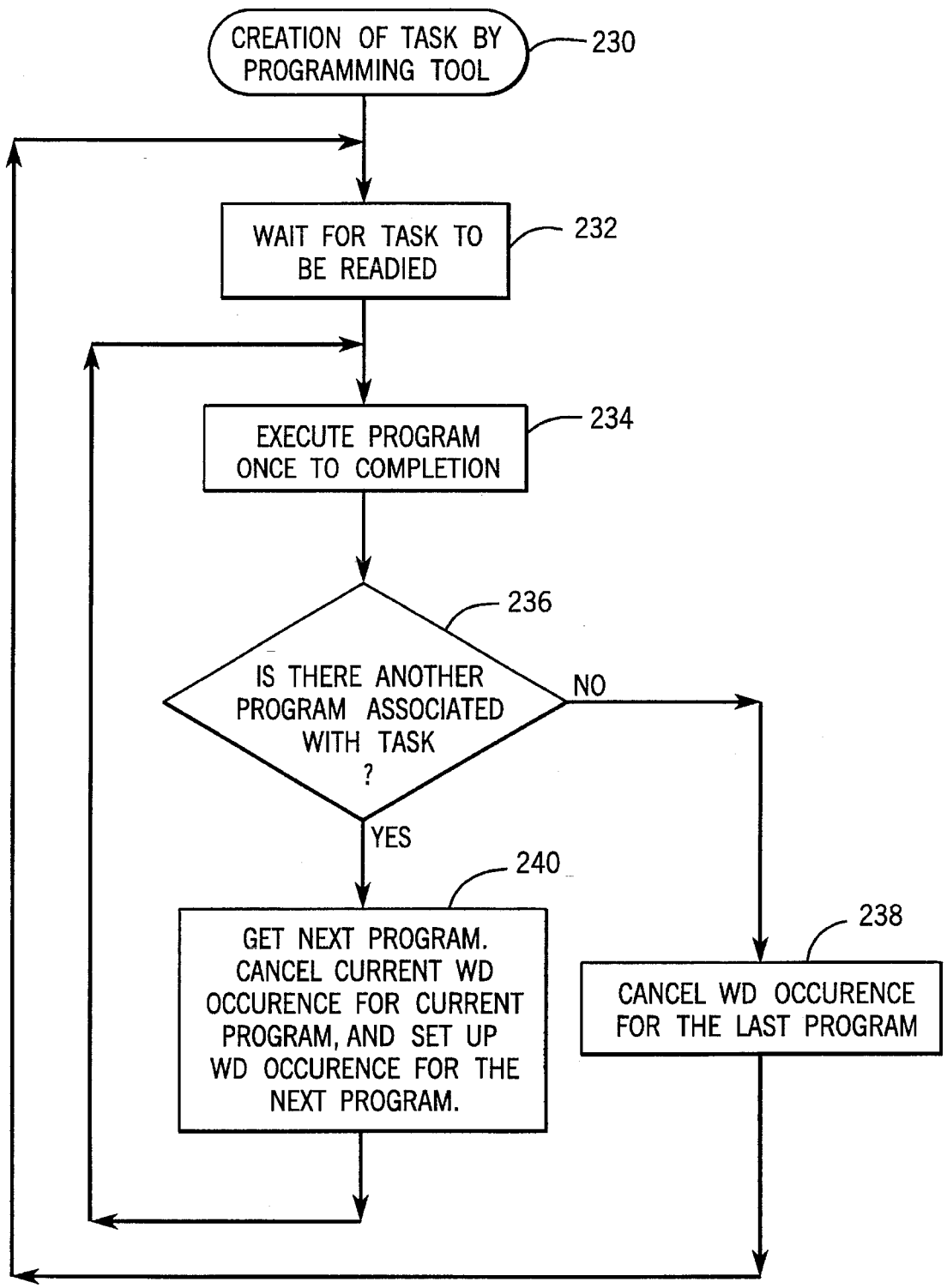

Referring now to FIG. 7(c), the life of a task begins with the entering of task data indicated by process block 230. The operating system then generally waits at process block 232 for entry of the task into the ready list 120 per FIGS. 7(a) and 7(b) as described above. Once a task is readied, the first program of the task is executed once to completion from a starting point to an ending point as indicated by process block 234. At subsequent decision block 236, task scheduling table 88 is consulted to see if there is another program associated with the task. If not, then at process block 238 the watchdog occurrence previously enrolled in the occurrence queue 104 is cancelled and the program returns to process block 232 to wait for the task to be readied again.

If at decision 236, however, there is another program associated with the task, then at process block 240 the next program is loaded, the current watchdog for the program just executed is cancelled and the watchdog for the next program is set up as an occurrence in the occurrence queue 104. The next program is then executed by jumping to process block 234.

This process will continue until there are no more programs associated with the tasks that have not been executed once. At this point the watchdog occurrence for the last program will be cancelled and the task will be readied once again as described with respect to FIGS. 7(a) or 7(b).

As described above with respect to FIG. 7(c), the ready list 120 is examined by the operating system 87 and the highest priority tasks identified. If the highest priority task has a priority higher than a task currently being executed (in yet another system task), then the task being executed is suspended (its values are saved so that it may be run again from the point at which it was suspended) and the new task of higher priority is run. When the task identified as being of higher priority is finished, it is removed from the ready list 120 and the next task of lower priority on the list (suspended or never run) is executed. Thus event tasks of higher priority displace periodic tasks of lower priority, and periodic tasks of higher priority displace event tasks of lower priority. Multiple tasks of the same priority are run on a time slice basis equally sharing the processor without regard to the type of triggering of the task (periodic or event).

The continuous task executes only when there are no other tasks on the ready list 120 due to its having the lowest priority.

Thus the present invention permits a dynamic scheduling of mixed trigger type tasks, both those that occur periodically on a regular basis and those that can occur at any time based on an event occurrence. This ability to integrate both event driven and periodic type tasks permits greater efficiency in the use of the processor by avoiding the need for the processor to execute event driven tasks that are time critical at a high rate when the events are not pending. The use of watchdog times keyed to each program of a task permits this dynamic scheduling to operate in the critical environment of industrial control by providing a clear indication of processor overload and the failure of critical tasks to be promptly executed. In addition to tracking elapsed real-time during the execution of a task, the present invention may also track the actual execution times of each task. These statistics may be used empirically to determine the proper load of the processor or a given control system which vary depending on the actual machinery being controlled.

Breakpoint Detection

Figure 9:
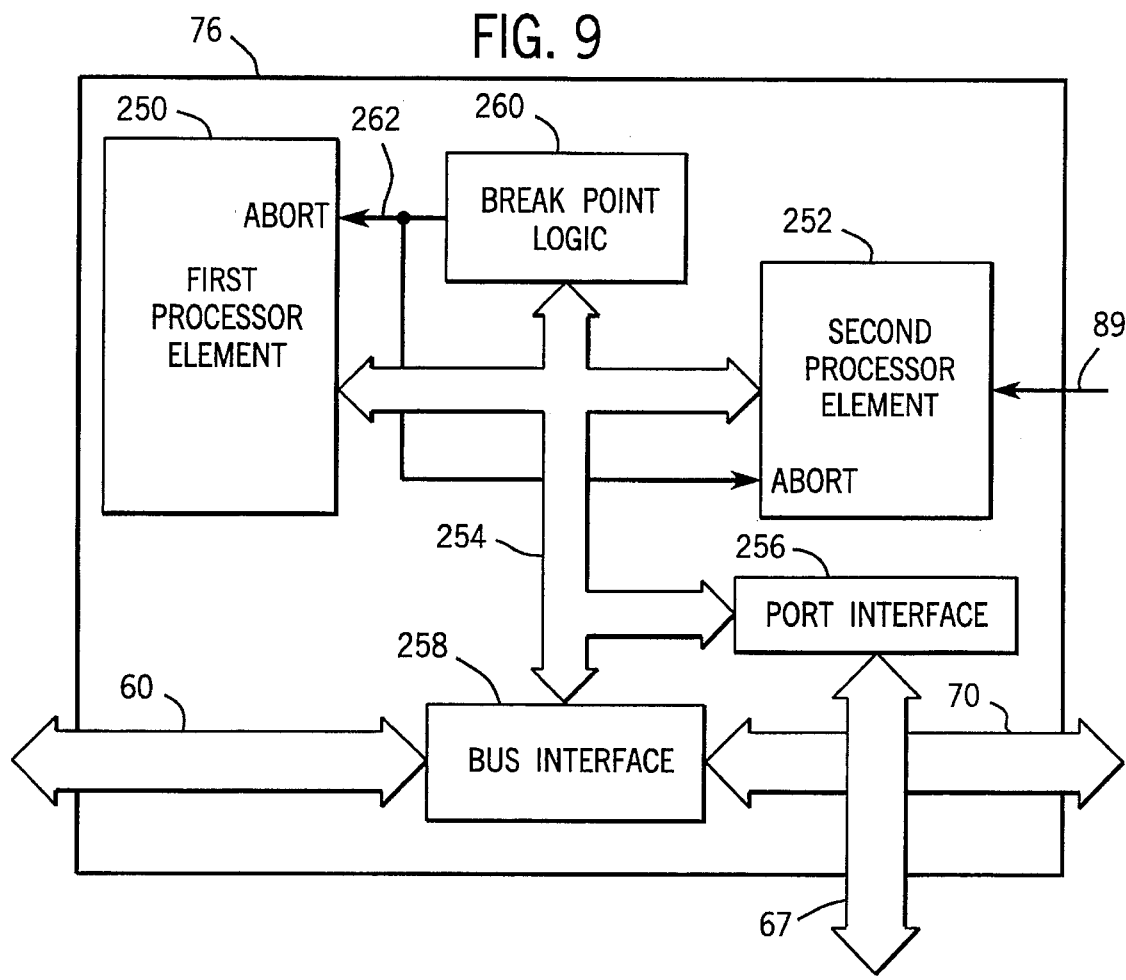
FIG. 9 is a yet more detailed block diagram of the processor of the controller of FIG. 2 and FIG. 3 showing the breakpoint circuitry used to detect the accessing of particular memory locations by either of two processor elements of the subprocessor of FIG. 3 to provide a breakpoint signal to one processor element.

Referring now to FIG. 9, the subprocessor 76 incorporates a first and second processor element 250 and 252, each specialized to execute a particular set of instructions,.

Generally first processor element 250 is optimized for the execution of relay ladder language and other specialized languages addressing the particular need of real-time industrial control. Second processor element 252 is a general-purpose reduced instruction set computer ("RISC") providing a limited but more generalized instruction such as known generally in the art. The first processor element 250 and the second processor element 252 communicate with each other via secondary bus 254 having 32 address lines, 32 data lines, and a number of control lines to be described below. The bus interface 258 provides for the addressing of the RAM 64 and EPROM 72 through only 22 or 24 address bits, respectively.

The operation of the secondary bus 254 is according to general principles well known in the art and permits the first and second processor elements to communicate with a port interface 256 providing port signal 67 and with a bus interface 258 providing communication with the internal bus 60 and 70 described above. The secondary bus 254 also communicates with breakpoint logic circuitry 260 which monitors the address and control lines of the secondary bus 254 (according to instructions previously received on the data lines of the secondary bus 254) to provide a breakpoint signal on abort input 262 to the first processor element 250 and second processor element 252 as will be described in more detail below. Generally, only the active processor element 250 or 252 detects the breakpoint. Further, if the active processor is the first processing element 250 then it suspends execution and returns control to the second processing element 252.

Figure 10:
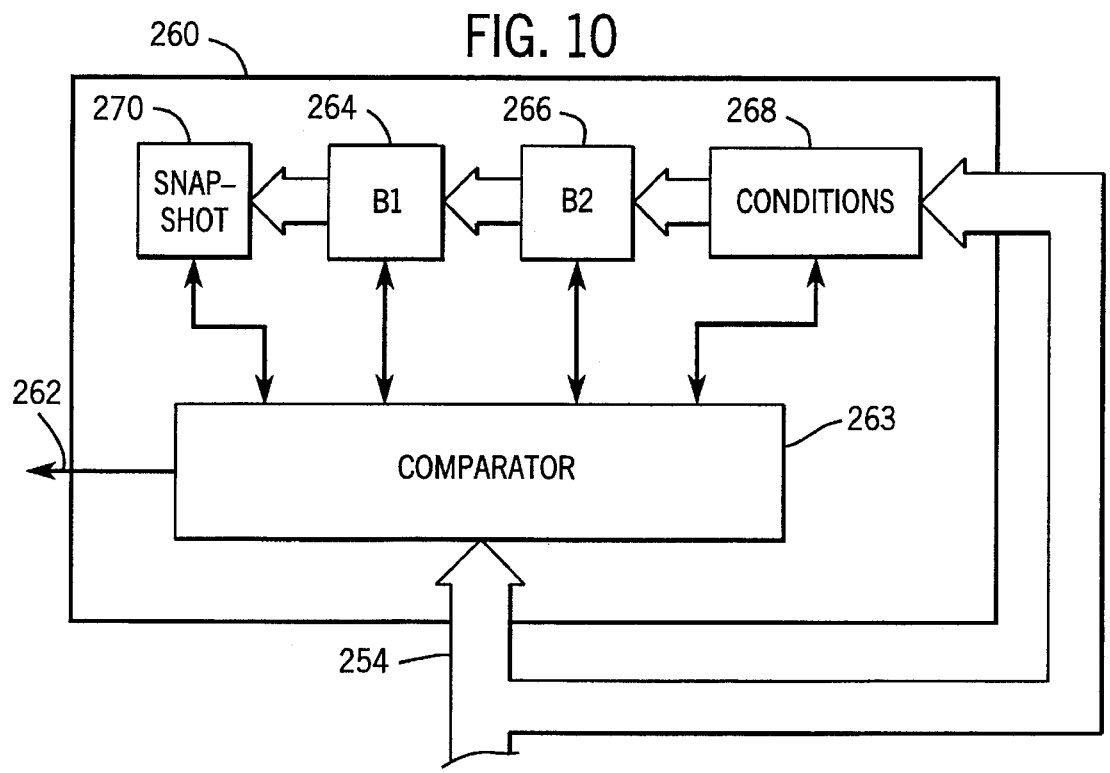
FIG. 10 is a block diagram in yet further detail of the breakpoint circuitry of FIG. 9 showing the registers used to program a comparator for generating the breakpoint signal.

Referring to FIGS. 9 and 10, the breakpoint logic circuitry 260 includes a multiple bit comparator 263 that may compare the address on secondary bus 254 to values contained in registers B1 264, and B2 266 in order to generate the breakpoint signal on the abort line 262. Each of registers B1 and B2 may receive a 25 bit address via the data lines of the secondary bus 254 which is then used to establish a range of addresses that will generate the breakpoint signal on the abort line 262. The breakpoint signal is separate from general processor interrupts as are known in the art. When the breakpoint signal occurs, interrupts are disabled to prevent task switching (as will be described) until the breakpoint signal is processed.

The comparator 263 logically compares the values in registers B1 and B2 to the least significant 25 bits of the addresses on the secondary bus 254 according to instructions contained in a condition register 268. Condition register 268 provides further conditions to the generation of a breakpoint signal according to the setting of its 32 bits as listed in Table 1.

TABLE 1

| Bit No. | Action |
| --- | --- |
| 0 | Generate breakpoint signal if address is greater than 16 Mbytes |
| 1 | Reserved |
| 2 | Enable breakpoint if B1 is < |

TABLE 1-continued

| Bit No. | Action |
|---|---|
| | address |
| 3 | Enable breakpoint if B1 = address |
| 4 | Enable breakpoint if B2 is > address |
| 5 | Enable breakpoint if B2 = address |
| 6 | Generate breakpoint signal if B1 OR B2 is true (if this bit is reset B1 AND B2 must be true) |
| 7 | Reserved |
| 8 | Generate breakpoint only if instruction fetch |
| 9 | Generate breakpoint only if read cycle |
| 10 | Generate breakpoint only if write cycle |
| 11 | Byte level resolution of breakpoint |
| 12 | Half word resolution of breakpoint |
| 13–24 | Reserved |
| 25–31 | Generate breakpoint delay |

The first bit of the condition register 268 instructs the comparator 263 to generate a breakpoint signal if the addresses of memory being accessed is over 16 megabytes, the limit of the memory space of the controller 10. Such addresses are outside the memory space and are necessarily erroneous.

Bits 2–5 define the Boolean conditions under which the values in register B1 and B2 will be interpreted. Generally if bit 2 is set, bit 3 should be set as well and if bit 4 is set, bit 5 should be set as well. Thus either register B1 (or B2) may define a LESS THAN (GREATER THAN) or a LESS THAN OR EQUAL (GREATER THAN OR EQUAL) condition for the breakpoint to occur.

Bit 6 provides the logical combination of the registers B1 and B2 to identify a range of address values that will cause a breakpoint. By setting this bit, a breakpoint is generated if the global memory address is outside of the addresses between B1 and B2 (if B1 is a higher value than B2). If this bit is reset, then a breakpoint is generated if the global memory address is within the range of addresses between B1 and B2 (if B1 is a lower value than B2). The first configuration may be useful for detecting tasks which are affecting memory outside of their intended range. If only bits 3 or 5 are set, indicating an equals only condition, and this bit is set, a breakpoint will be generated if the address equals the value in B1 or the value in B2.

Bits 8–10 provide additional conditions for generating the breakpoint signal, in particular, whether the memory access is an instruction fetch as determined by bit 8 (that is the processor believes it is reading an instruction rather than data. The breakpoint signal may be restricted to situations where a read from global memory is being performed (by bit 9) or to situations where a write to global memory is being performed (by bit 10). Each of these conditions is detected by the comparator 263 reading the control lines within the secondary bus 254.

Bits 11 and 12 determine whether the least significant bits of the registers B1 and B2 will be considered in the address comparison process and thus whether the breakpoint resolves to a byte (8 bits), a half word (16 bits), or a full word (32 bits) if neither bits 11 nor 12 are set. Bits 25 through 31 provide a setting of a counter within the comparator 263 which determines the number of breakpoint conditions which must be detected prior to the abort being generated on abort line 262. Thus, for example, the third "read" from a particular memory location may be used to generate the breakpoint signal.

The information of these registers 264 through 268 is typically entered by the programmer through terminal 19 during evaluation of the task software during operation conditions.

When a breakpoint signal is generated on the abort line 262, a snapshot register 270 stores the information shown in Table 2 to assist in verifying the condition of the abort.

TABLE 2

| Bits | Meaning |
|---|---|
| 0–24 | Address bus value when breakpoint signal occurred |
| 25 | Address was equal to register value |
| 26 | Address was less than register value |
| 27 | Out of range abort |
| 28 | Value in register B1 matched address when breakpoint occurred |
| 29 | Value in register B2 matched address when breakpoint occurred |
| 30 | Instruction fetch was occurring when breakpoint occurred |
| 31 | Processor was writing when breakpoint occurred |

Thus the first 25 bits of the snapshot register 270 confirm the address on the secondary bus 254 when the breakpoint signal occurred. This value is important when the breakpoint is programmed to occur within a range of addresses.

Bits 25, 26, 28, and 29 indicate (by being set) the condition causing the breakpoint signal and, in particular, which register B1 provided the decisive condition in the case of an OR logic and whether the address was less than or equal to that register value.

Bit 27 when set indicates that the breakpoint signal was caused by an attempt to access memory that was out of range.

Bit 30 being set indicates that an instruction was being fetched, and bit 31 indicating whether it was a read or a write condition.

This basic information in the snapshot register is supplemented by a breakpoint record routine stored in memory and executed when the breakpoint signal is received by processor element 250 or 252 on the abort line 262. Upon the occurrence of the breakpoint signal, detected by the second processor element 252, that processor element executes a routine pointed to by an interrupt vector according to methods well understood in the art. This routine collects, among other values that may be selected by the programmer, an indication of the current task 100 being executed when the breakpoint occurred. In the event that a single memory location is being trapped, the value of the data in the memory location may be stored. The breakpoint record routine also saves and displays to the operator information about the status of the various tasks as is provided in occurrence queue 104 and ready list 120 described above. Thus, the breakpoint record routine provides important information as to the interaction of the memory of RAM 64 and 72 and the processor 62 during the execution of multiple tasks as affected by the actual operation of the controlled equipment.

Upon the occurrence of a breakpoint signal detected by processing element 250, processing element 250 stops execution and provides a vector to processor element 252. This vector is the address of a routine similar to that used above for the breakpoint detected by processor element 252. This enables a single routine to be executed by processing element 252 to collect information about breakpoints.

It is important to note that because the controlled equipment and the timing of the processes it controls can substantially affect the order and duration of the execution of tasks, the breakpoint logic circuitry 260 in evaluating unexpected conditions that occur only rarely. As a separate circuit element from the processor elements 250 and 252, the breakpoint logic does not delay the execution of the tasks during normal operation.

The above description has been that of a preferred embodiment of the present invention. It will occur to those that practice the art that many modifications may be made without departing from the spirit and scope of the invention. In order to apprise the public of the various embodiments that may fall within the scope of the invention, the following claims are made.

We claim:

1. An industrial controller operating controlled equipment according to a control program divided into at least two tasks, the controller comprising:
   (a) an I/O module receiving electrical inputs and outputs connected to controlled equipment;
   (b) a user terminal for entering data from the user providing a breakpoint value;
   (d) an electronic memory;
   (e) a bus communicating signals to and from the electronic memory for transferring data to and from memory locations of the electronic memory, the data of the memory including:
      (i) instructions for the at least two tasks of the control program;
      (ii) variables for the at least two tasks of the control program;
      (iii) an operating system program controlling the execution of the tasks according to a task scheduling table;
      (iv) instructions for a breakpoint recording program,
   (d) means for monitoring the memory locations of the transfer of data to and from electronic memory to produce a breakpoint signal when the memory location matches at least one particular memory location indicated by the breakpoint value;
   (e) an electronic processor communicating with the I/O module to receive the inputs and change the outputs, according to the inputs and the control program, and executing the operating system program to:
      (i) execute a specific one of the at least two tasks according to the task scheduling table;
      (ii) upon the occurrence of the breakpoint signal executing the breakpoint record routine to record an indication the specific one of the at least two tasks.

2. The industrial controller of claim 1 wherein the breakpoint record routine also records an indication of the value of data associated with the specific memory location at the time of the breakpoint signal.

3. The industrial controller of claim 1 wherein the means for monitoring also records an indication of whether data associated with the specific memory location at the time of the breakpoint signal was an instruction.

4. The industrial controller of claim 1 wherein the means for monitoring also records an indication of whether data was being written to or read from the specific memory location at the time of the breakpoint signal.

5. The industrial controller of claim 1 wherein the means for monitoring the memory locations provides the breakpoint signal only when the memory location is a particular memory location indicated by the breakpoint value and when the data is transferred to the memory location.

6. The industrial controller of claim 1 wherein the means for monitoring provides the breakpoint signal only when the memory location is a particular memory location indicated by the breakpoint value and when the data is transferred to the memory location.

7. The industrial controller of claim 1 wherein the means for monitoring the memory locations provides the breakpoint signal when the memory location is a particular memory location indicated by the breakpoint value and when the data transferred from the memory location is an instruction.

8. The industrial controller of claim 1 wherein the means for monitoring includes a comparator and at least two registers providing a high and low address value and wherein the means for monitoring provides the breakpoint signal when the memory location is between the high and low address.

9. The industrial controller of claim 1 wherein the means for monitoring includes a comparator and at least two registers providing a high and low address range and wherein the means for monitoring provides the breakpoint signal when the memory location is outside of a range between the high and low address.

* * * * *